United States Patent
Peel et al.

(10) Patent No.: US 10,739,075 B2
(45) Date of Patent: Aug. 11, 2020

(54) DROSS HANDLING METHODS AND APPARATUS

(75) Inventors: Alan Peel, Derbyshire (GB); Andrew Gibbs, Derbyshire (GB)

(73) Assignee: ALTEK EUROPE LIMITED, Derbyshire (GB)

( * ) Notice: Subject to any disclaimer, the term of this patent is extended or adjusted under 35 U.S.C. 154(b) by 867 days.

(21) Appl. No.: 13/638,831

(22) PCT Filed: Apr. 1, 2011
(Under 37 CFR 1.47)

(86) PCT No.: PCT/GB2011/050670
§ 371 (c)(1),
(2), (4) Date: Dec. 5, 2012

(87) PCT Pub. No.: WO2011/121367
PCT Pub. Date: Oct. 6, 2011

(65) Prior Publication Data
US 2013/0075964 A1    Mar. 28, 2013

(30) Foreign Application Priority Data

Apr. 1, 2010  (GB) .................................. 1005637.2
Jun. 21, 2010  (GB) .................................. 1010441.2

(51) Int. Cl.
| | |
|---|---|
| *F27D 99/00* | (2010.01) |
| *C22B 7/04* | (2006.01) |
| *C22B 21/00* | (2006.01) |
| *C22B 7/00* | (2006.01) |

(52) U.S. Cl.
CPC .............. *F27D 99/00* (2013.01); *C22B 7/004* (2013.01); *C22B 7/04* (2013.01); *C22B 21/0069* (2013.01); *Y02P 10/212* (2015.11)

(58) Field of Classification Search
CPC ....... C22B 7/004; C22B 21/0069; C22B 7/04; F27D 99/00; B22D 11/119; B22D 11/10; Y02P 10/212
USPC .... 266/227, 229, 200, 201, 205, 44; 75/585, 75/672, 414, 640, 655, 770; 228/203, 19
See application file for complete search history.

(56) References Cited

U.S. PATENT DOCUMENTS

| | | | |
|---|---|---|---|
| 1,974,282 A | | 9/1934 | Kempton |
| 4,059,429 A | * | 11/1977 | Carmi et al. .................... 65/355 |
| 5,397,104 A | * | 3/1995 | Roth .............................. 266/227 |
| 5,788,918 A | * | 8/1998 | Bramley ....................... 266/158 |
| 5,811,056 A | * | 9/1998 | Bramley ................. C22B 7/004 |
| | | | 266/205 |

(Continued)

*Primary Examiner* — Jessee R Roe
*Assistant Examiner* — Michael Aboagye
(74) *Attorney, Agent, or Firm* — Kirton McConkie; Evan R. Witt

(57) ABSTRACT

Apparatus and a method of handling a molten metal processing by-product are provided in which the by-product is placed in a container unit and put in the apparatus, the apparatus including an element having a first position outside of the container and a second position in which at least a part of the element is in the container so as to compress the by-product and exclude oxygen from it. The element also serves to transfer heat from the contents of the container unit to the element and so provide cooling. The element can then be returned to the first position, the container unit be removed and placed at a cooling location for final cooling.

10 Claims, 6 Drawing Sheets

(56) References Cited

U.S. PATENT DOCUMENTS

2003/0084699 A1 5/2003 Blue
2005/0098930 A1 5/2005 Roth

\* cited by examiner

DROSS HANDLING METHODS AND APPARATUS

CROSS-REFERENCE TO RELATED APPLICATIONS

This application is a National Stage of International Application No. PCT/GB2011/050670, filed Apr. 1, 2011, and entitled IMPROVEMENTS IN AND RELATING TO DROSS HANDLING METHODS AND APPARATUS, which claims the benefit of GB 1005637.2, filed Apr. 1, 2010 and GB 1010441.2, filed Jun. 21, 2010. This application claims priority to and incorporates herein by reference the above-referenced applications in their entirety.

BACKGROUND OF THE INVENTION

The present invention concerns improvements in and relating to methods and apparatus for handling products and/or by-products from molten metal processing and in particular drosses and/or slags arising therefrom.

In many molten metal processing operations by-products on the surface of the molten metal arise. These are commonly referred to as slags or drosses. They are normally separated from the molten metal in one or more operations. They frequently incorporate metal within them and hence it is useful to recover that metal if possible.

Particularly in the context of aluminium processing, whilst some attempts have been made to recover the metal, the recovery is not complete.

The present invention seeks, amongst its potential benefits, to provide for improved handling of the dross products. The present invention seeks, amongst its potential benefits, to recover more metal from the dross products.

BRIEF SUMMARY OF THE INVENTION

According to a first aspect, the invention provides a method of handling a molten metal processing by-product, the method including:
  providing a device comprising: an enclosure; a compressing element; an actuator connected to the compressing element; wherein the compressing element includes: a upper surface provided with an inlet and an outlet; a lower surface; an at least partially hollow interior provided between the upper surface and the lower surface, the hollow interior being connected to the inlet and the outlet; the hollow interior being provided with: one or more fluid flow constraining surfaces provided by one or more walls of the hollow interior; and one or more fluid flow control elements provided in the hollow interior, the one or more fluid flow control elements being additional to the one or more fluid flow constraining surfaces provided by the one or more walls of the hollow interior;
  the method including: providing metal and by-product to be separated in the container unit; providing the container unit in the enclosure; moving the compressing element to compress the by-product in the container unit; cooling the compressing element by providing a fluid flow into the inlet, along the one or more flow constraining surfaces and one or more flow control elements and out of the outlet.

According to a second aspect, the invention provides a compressing element, the compressing element having: a upper surface provided with an inlet and an outlet; a lower surface; an at least partially hollow interior provided between the upper surface and the lower surface, the hollow interior being connected to the inlet and the outlet; the hollow interior being provided with: one or more fluid flow constraining surfaces provided by one or more walls of the hollow interior; and one or more fluid flow control elements provided in the hollow interior, the one or more fluid flow control elements being additional to the one or more fluid flow constraining surfaces provided by the one or more walls of the hollow interior.

According to a third aspect, the invention provides a device for handling a molten metal processing by-product, the device comprising: a metal from by-product separator including: an enclosure, in use, the enclosure receiving a container unit containing metal and by-product to be separated; a compressing element, in use, the compressing element compressing by-product in the container unit; an actuator connected to the compressing element; wherein the compressing element includes: a upper surface provided with an inlet and an outlet; a lower surface; an at least partially hollow interior provided between the upper surface and the lower surface, the hollow interior being connected to the inlet and the outlet; the hollow interior being provided with: one or more fluid flow constraining surfaces provided by one or more walls of the hollow interior; and one or more fluid flow control elements provided in the hollow interior, the one or more fluid flow control elements being additional to the one or more fluid flow constraining surfaces provided by the one or more walls of the hollow interior.

The one or more fluid flow constraining surfaces provided by one or more walls of the hollow interior may be those parts of the upper surface and/or inner surface which face the hollow interior. The one or more flow constraining surface may provide the bounds of the hollow interior through which there is fluid flow.

The one or more fluid flow control elements may be or include one or more elements defining a surface in opposition to the inside surface of the lower surface of the compressing element. The one or more elements may include one or more baffles. The baffle(s) may be provided at a constant separation from the inner surface of the lower surface of the compressing element and/or within a limited range of separation values. The baffle(s) may have such a separation which is a minimum of 20 mm, preferably 30 mm and ideally 40 mm and/or which is a maximum of 80 mm, preferably 70 mm and ideally 60 mm.

The baffle(s) may be spaced from one or more flow control elements of another type or types. The baffle(s) may have such a spacing which is a minimum of 10 mm, preferably 15 mm and ideally 20 mm and/or which is a maximum of 60 mm, preferably 50 mm and ideally 40 mm.

The one or more fluid flow control elements may be or include an element which is provided between the inlet and the outlet. The element may extend from the inner surface of the lower surface to the inner surface of the upper surface and/or one or more elements provided in opposition to the inside surface of the lower element at one or more locations and more preferably along its length. The length may be less than the length of the hollow interior at that position. A gap between one side and the other side of the element may be provided at one or both ends thereof and/or one or more intermediate locations.

The one or more flow elements may include one or more ribs or other projections. One or more of the one or more flow elements may extend in radial direction relative to the inlet and/or outlet and/or the junction of the inlet with the hollow interior and/or junction of the outlet with the hollow interior. The one or more flow elements may include flow elements of one or more different lengths and/or widths and/or heights and/or profiles. The one or more flow elements may be provided on the inner surface of the lower surface of the compressing element.

The inlet may be provided between the centre of the compressing element and the periphery of the compressing element. The inlet may be provided between 40% and 60% of the way between the centre and periphery. The outlet may be provided between the centre of the compressing element and the periphery of the compressing element. The outlet may be provided between 40% and 60% of the way between the centre and periphery. The inlet and outlet may be provided at equivalent positions to one another. The inlet and outlet may be provided in proximity with one another, for instance within 30 cm of each other.

The fluid may be a gas and is particularly air.

The one or more flow elements may provide distribution of the fluid flow over all the inner surface of the lower surface of the compressing element.

The device may be a metal from by-product separator. The metal from by-product separator may be a dross press.

The enclosure may have a rear wall, side walls, roof and front wall. The front wall may be or include one or more doors.

The enclosure may be provided with one or more apertures, particularly in the roof thereof. One or more of the apertures may provide a passage for one or more parts of the actuators provided outside of the enclosure into the enclosure. One or more of the apertures may provide an outlet. The outlet may be for gas arising from the container unit and/or particulate material, for instance arising from the container unit, and/or air in the enclosure. The air may be drawn out of the enclosure through the outlet, for instance by a fan. A gas treatment unit may be connected to the one or more outlets. A particulate matter collection unit may be connected to the one or more outlets.

The compressing element may be a press head. The compressing element may include a lower surface and an upper surface. The lower surface may have one or more downward extending protrusions or surfaces. The lower surface may, relative to a horizontal plane, have a downward extent which varies with position in the horizontal plane. The variation in downward extent may be such as to give a domed lower surface. The dome may have a circular or oval perimeter. The variation in downward extent may be such as to give a pyramidal lower surface. The lower surface may be in the form of an inverted dome. The lower surface may be in the form of an inverted pyramid.

The compressing element may have a lower surface which is complimentary, in part or wholly, to the opposing part of the container and/or a receiving location therein. The outside surface of the lower surface of the compressing element, and particularly that opposing the receiving location may be smooth. The outside surface of the lower surface of the compressing element, particularly that opposing the receiving location, may be provided with one or more protrusions and/or recesses. One or more of the protrusions may be in the form of a rib.

One or more parts, particularly the lower surface, of the compressing element may contact the by-products in use. In particular, they may compress the by-products in use, for instance between the one or more parts and the inside surface of the container.

The compressing element may be provided with an abutment surface. The abutment surface may be adapted to receive and/or cooperate with the actuator. The actuator may be received and/or cooperated with directly or indirectly.

The actuator may include a ram. The abutment surface may be provided on the upper surface of the closure element.

The device may receive a container unit.

The device may be part of a kit including one or more, and preferably eight or more container units.

The container unit may include a support structure for one or more containers.

The support structure may include one or more elements for supporting the container against deformation. The support structure may maintain the profile of the container, for instance during the application of a force into the container and/or the compression of by-products within the container.

The support structure may include one or more elements for supporting the container in an orientation. The support structure may maintain the container in an orientation relative to a surface and/or on a level. The support structure may provide one or more support surfaces in a common plane, that plane being lower than other parts of the support structure.

The support structure may include one or more elements for supporting the container during transport and/or lifting. The support structure may include one or more elements which provide lifting locations, for instance by releaseably engage with a lifting device. The one or more lifting locations may include a planar surface. The planar surface may be an internal surface of a hollow component, such as a tube or sleeve.

The container may be dished. The container may have the greatest depth at its centre. The container may have a circular profile in plan view. The container may have its greatest depth along a centre line. The container may have an oval profile in plan view. The oval may have curved or straight sides.

The inside surface of the container may be smooth. The inside surface of the container may be provided with one or more protrusions and/or recesses. One or more of the protrusions may be in the form of a rib.

A closure element may be provided for the container unit. The closure element may be provided on top of the container unit in use. The closure element may be include a lower surface and an upper surface. The lower surface may have one or more downward extending protrusions or surfaces. The lower surface may, relative to a horizontal plane, have a downward extent which varies with position in the horizontal plane. The variation in downward extent may be such as to give one or more domes on the lower surface. The domes may have a circular or oval perimeter. The variation in downward extent may be such as to give one or more pyramids on the lower surface. The variation in downward extent may be such as to give one or more wedges on the lower surface. The lower surface may be in the form of one or more inverted dome. The lower surface may be in the form of one or more inverted pyramids. The lower surface may be in the form of one or more inverted wedges.

One or more parts, particularly the lower surface, of the closure element may contact the byproducts in use. In particular, they may provide heat transfer between the by-products and one or more parts of the container unit and/or closure element.

The closure element may include one or more elements for supporting the closure element during transport and/or lifting. The closure element may include one or more elements which provide lifting locations, for instance by releaseably engage with a lifting device. The one or more lifting locations may include a planar surface. The planar surface may be an internal surface of a hollow component, such as a tube or sleeve. The lifting locations may be provided on an upper surface of the closure element.

The container unit may include a contact surface. The closure element may include a second contact surface.

The contact surface may extend around the entire perimeter of the receiving location. The contact surface may be provided at the edge of the container and/or may be provided at the edge of the receiving location and/or may be provided intermediate the edge of the container and edge of the receiving location. The contact surface may be a planar surface. The contact surface may be horizontal +/−10°. The contact surface may be inclined, for instance with a part which is nearer the receiving location being lower than a part which is further from the receiving location. The contact surface may by annular in plan view. The contact surface may be oval in plan view, for instance with straight sides or curved sides. The second contact surface may extend around the entire perimeter of the receiving location. The second contact surface may be provided at the edge of the closure element, particularly on the lower surface thereof and/or may be provided at the edge of the receiving location and/or may be provided intermediate the edge of the closure element and edge of the receiving location. The second contact surface may be a planar surface. The second contact surface may be horizontal +/−10°. The second contact surface may be inclined, for instance with a part which is closer to the receiving location lower than a part which is further from the receiving location. The second contact surface may by annular in plan view. The second contact surface may be oval in plan view, for instance with straight sides or curved sides.

The contact surface and second contact surfaces may have complementary profiles. The contact surface and the second contact surface may have corresponding shapes and/or configurations and/or dimensions.

The contact surface and second contact surface may provide a restriction to the flow of gas from the environments of the apparatus into the receiving location. The contact surface and second contact surface may seal the receiving location against the flow of gas from the environments of the apparatus into the receiving location. The gas may be air. The gas may include oxygen.

The contact surface and second contact surface may directly abut one another. The contact surface and second contact surface may indirectly abut one another, for instance one or more components may be provided in the contact surface and/or the second contact surface and those may abut one another and/or the opposing contact surface. One or more agents may be provided between the contact surface and the second contact surface and/or in proximity thereto. The one or more agents may be metal from within the receiving location.

The inside of the container may be provided with one or more through apertures. The one or more through apertures may lead to a channel or chamber. The channel or chamber may be provided in the support structure and/or below the container.

In the first state, the receiving location may be exposed.

In the second state, the contact may provide a restriction to the flow of gas from the environments of the apparatus into the receiving location and/or may seal the receiving location against the flow of gas from the environments of the apparatus into the receiving location.

One or more parts of the closure element may provide one or more support locations. The one or more support locations may support a further apparatus, particularly a further support structure thereof, provided on top of the apparatus.

One or more parts of the container, particularly the support structure, may provide one or more support locations. The one or more support locations may contact a further apparatus, particularly a closure element thereof, provided below the apparatus.

The first and/or second and/or third aspects of the invention may include any of the features, or possibilities set out herein, including in the description and/or other aspects.

According to a fourth aspect, the invention provides a method of handling a molten metal processing by-product, the method including: providing a device comprising: an enclosure; a compressing element; an actuator connected to the compressing element; a controller; a detector; wherein the method includes: providing metal and by-product to be separated in the container unit; providing the container unit in the enclosure; moving the compressing element to compress the by-product in the container unit; wherein the controller receives signals from the detector and provides control signals to one or more components of the device.

According to a fifth aspect, the invention provides a device for handling a molten metal processing by-product, the device including: an enclosure, in use, the enclosure receiving a container unit containing metal and by-product to be separated; a compressing element, in use, the compressing element compressing by-product in the container unit; an actuator connected to the compressing element; a controller; a detector; wherein the controller receives signals from the detector and provides control signals to one or more components of the device.

The control signals may prevent operation of one or more components of the device. The control signals may prevent operation of the door. The control signals may prevent operation of the actuator. The control signals may prevent operation of the compressing element.

The control signals may allow operation of one or more components of the device. The control signals may allow operation of the door. The control signals may allow operation of the actuator. The control signals may allow operation of the compressing element.

The components may be one or more of: a door, the compressing element, the actuator, a fluid extraction device, such as a fan.

The detector may be a combination of a transmission device and a detector for the transmissions, for instance light. The detector may detect the presence and/or interruption of transmissions. A detector may include a plurality of detectors, for instance to detect a range of positions where a part might be present or absent.

A plurality of detectors may be provided to detect different values. One or more of the detectors may be provided to detect two or more of the different values. The values may relate to the container unit position and/or height and/or presence of a structure extending through the door plane and/or actuator position and/or compressible element position and/or one or more materials, preferably solid and/or liquid materials, exiting the container unit. The one or more materials exiting the container unit may include molten metal. The one or more material may exit the container unit between the top of the container unit and the bottom of the compressing element.

The method may include lifting a container unit.

The method may include filling the container on the container unit with by-product.

The method may include opening a door on the device.

The method may include advancing a container unit into the device, particularly the enclosure thereof. The method may include advancing a part of a lifting device into the device, particularly the enclosure thereof. The method may include advancing a part of a lifting device provided with a container unit thereon into the device, particularly the enclosure thereof. The method may include placing the container unit on a support surface in the device. The method may include withdrawing the part of the lifting device from the device.

The method may include checking the position of the container unit. The method may include checking the position of the container unit in terms of its position on an X axis relative to the device, such as the position across the width of the device. The method may include checking the position of the container unit in terms of its position on a Y axis relative to the device, such as the position into the depth of the device. The method may include checking the position of the container unit in terms of its position on a Z axis relative to such a device, such as the height of the container unit. The position of the container unit may be checked by checking the position of one or more parts thereof.

The method may include establishing the type of container unit provided in the device. The type may be established by checking one or more dimensions and/or positions of parts of the container unit. The type may be established by checking the height of the container unit.

The method may include closing a door on the device.

The method may include moving the actuator. The method may include moving the actuator down towards the support surface and/or container unit.

The method may include moving the compressing element. The method may include moving the compressing element down towards the support surface and/or container unit.

The method may include compressing the by-product. The method may include compressing the by-product in the container unit.

The method may include applying a load to the actuator and/or compressing element and/or container unit. The load may be maintained for a period of time. A load profile may be maintained for a period of time. The profile may include one or more variations in load. The method may include stopping compression of the by-product and/or moving the compressing element up away from the support surface and/or container unit and/or reducing and/or removing the load applied to the actuator and/or compressing element and/or container unit, particularly if one or more materials, preferably solid and/or liquid materials, are detected exiting the container unit. The detection of one or more materials exiting the container unit is preferably detected by the same detector or detectors used to detect the position of the container unit and/or part of the lifting device, for instance relative to the plane of the door.

The method may include moving the actuator again. The method may include moving the actuator up away from the support surface and/or container unit.

The method may include moving the compressing element again. The method may include moving the compressing element up away from the support surface and/or container unit.

The method may include opening a door on the device.

The method may include advancing a part of a lifting device into the device, particularly the enclosure thereof. The method may include lifting the container unit off a support surface in the device. The method may include withdrawing the part of a lifting device provided with a container unit thereon out of the device, particularly the enclosure thereof.

The method may include placing the container unit on a surface, for instance at a storage location.

The method may include lifting a closure element, for instance using a lifting device. The method may include placing the closure element on the container unit. The method may include disengaging the closure element from the lifting device.

The method may include leaving the container unit, preferably with a closure element, at a cooling location. The container unit may be left for a pre-determined period of time and/or until a level of cooling is achieved and/or the temperature is below a temperature threshold.

The controller may prevent the door operating and/or actuator operating and/or compressing element operating when advancing a container unit into the device and/or advancing a part of a lifting device into the device. The controller may prevent the door operating and/or actuator operating and/or compressing element operating when placing and/or removing the container unit on a support surface in the device. The controller may prevent the door operating and/or actuator operating and/or compressing element operating when the part of the lifting device is inside the plane of the door. The controller may prevent the door operating and/or actuator operating and/or compressing element operating when withdrawing the part of the lifting device from the device.

The controller may allow the door operating and/or actuator operating and/or compressing element operating when the part of the lifting device has withdrawn from the device. The allowance may be conditional on one or more other checks.

The controller may prevent the door operating and/or actuator operating and/or compressing element operating when the position of the container unit is not correct. The position may be considered in terms of the position of the container unit on an X axis relative to the device and/or on a Y axis relative to the device and/or on a Z axis relative to such a device.

The controller may allow the door operating and/or actuator operating and/or compressing element operating when the position of the container unit is correct. The allowance may be conditional on one or more other checks.

The controller may establishing the type of container unit provided in the device. The controller may be established by checking one or more dimensions and/or positions of parts of the container unit. The type may be established by checking the height of the container unit.

The controller may prevent opening a door on the device before the actuator and/or compressing element is lifted from the container unit and/or before being returned to a rest position.

The controller may allow opening of a door on the device after the actuator and/or compressing element have lifted from the container unit and/or returned to a rest position. The allowance may be conditional on one or more other checks.

The controller may prevent the door operating and/or actuator operating and/or compressing element operating when material is detected exiting the container unit.

The controller may allow the door operating and/or actuator operating and/or compressing element operating when material is not detected exiting the container unit.

The device may be a metal from by-product separator. The metal from by-product separator may be a dross press.

The enclosure may have a rear wall, side walls, roof and front wall. The front wall may be or include one or more doors.

The enclosure may be provided with one or more apertures, particularly in the roof thereof. One or more of the apertures may provide a passage for one or more parts of the actuators provided outside of the enclosure into the enclosure. One or more of the apertures may provide an outlet. The outlet may be for gas arising from the container unit and/or particulate material, for instance arising from the container unit, and/or air in the enclosure. The air may be drawn out of the enclosure through the outlet, for instance by a fan. A gas treatment unit may be connected to the one or more outlets. A particulate matter collection unit may be connected to the one or more outlets.

The compressing element may be a press head. The compressing element may include a lower surface and an upper surface. The lower surface may have one or more downward extending protrusions or surfaces. The lower surface may, relative to a horizontal plane, have a downward extent which varies with position in the horizontal plane. The variation in downward extent may be such as to give a domed lower surface. The dome may have a circular or oval perimeter. The variation in downward extent may be such as to give a pyramidal lower surface. The lower surface may be in the form of an inverted dome. The lower surface may be in the form of an inverted pyramid.

The compressing element may have a lower surface which is complimentary, in part or wholly, to the opposing part of the container and/or a receiving location therein. The outside surface of the lower surface of the compressing element, and particularly that opposing the receiving location may be smooth. The outside surface of the lower surface of the compressing element, particularly that opposing the receiving location, may be provided with one or more protrusions and/or recesses. One or more of the protrusions may be in the form of a rib.

One or more parts, particularly the lower surface, of the compressing element may contact the by-products in use. In particular, they may compress the by-products in use, for instance between the one or more parts and the inside surface of the container.

The compressing element may be provided with an abutment surface. The abutment surface may be adapted to receive and/or cooperate with the actuator. The actuator may be received and/or cooperated with directly or indirectly. The actuator may include a ram. The abutment surface may be provided on the upper surface of the closure element.

The device may receive a container unit.

The device may be part of a kit including one or more, and preferably eight or more container units.

The container unit may include a support structure for one or more containers.

The support structure may include one or more elements for supporting the container against deformation. The support structure may maintain the profile of the container, for instance during the application of a force into the container and/or the compression of by-products within the container.

The support structure may include one or more elements for supporting the container in an orientation. The support structure may maintain the container in an orientation relative to a surface and/or on a level. The support structure may provide one or more support surfaces in a common plane, that plane being lower than other parts of the support structure.

The support structure may include one or more elements for supporting the container during transport and/or lifting. The support structure may include one or more elements which provide lifting locations, for instance by releaseably engage with a lifting device. The one or more lifting locations may include a planar surface. The planar surface may be an internal surface of a hollow component, such as a tube or sleeve.

The container may be dished. The container may have the greatest depth at its centre. The container may have a circular profile in plan view. The container may have its greatest depth along a centre line. The container may have an oval profile in plan view. The oval may have curved or straight sides The inside surface of the container may be smooth. The inside surface of the container may be provided with one or more protrusions and/or recesses. One or more of the protrusions may be in the form of a rib.

A closure element may be provided for the container unit. The closure element may be provided on top of the container unit in use. The closure element may be include a lower surface and an upper surface. The lower surface may have one or more downward extending protrusions or surfaces. The lower surface may, relative to a horizontal plane, have a downward extent which varies with position in the horizontal plane. The variation in downward extent may be such as to give one or more domes on the lower surface. The domes may have a circular or oval perimeter. The variation in downward extent may be such as to give one or more pyramids on the lower surface. The variation in downward extent may be such as to give one or more wedges on the lower surface. The lower surface may be in the form of one or more inverted dome. The lower surface may be in the form of one or more inverted pyramids. The lower surface may be in the form of one or more inverted wedges.

One or more parts, particularly the lower surface, of the closure element may contact the byproducts in use. In particular, they may provide heat transfer between the by-products and one or more parts of the container unit and/or closure element.

The closure element may include one or more elements for supporting the closure element during transport and/or lifting. The closure element may include one or more elements which provide lifting locations, for instance by releaseably engage with a lifting device. The one or more lifting locations may include a planar surface. The planar surface may be an internal surface of a hollow component, such as a tube or sleeve. The lifting locations may be provided on an upper surface of the closure element.

The container unit may include a contact surface. The closure element may include a second contact surface.

The contact surface may extend around the entire perimeter of the receiving location. The contact surface may be provided at the edge of the container and/or may be provided at the edge of the receiving location and/or may be provided intermediate the edge of the container and edge of the receiving location. The contact surface may be a planar surface. The contact surface may be horizontal +/−10°. The contact surface may be inclined, for instance with a part which is nearer the receiving location being lower than a part which is further from the receiving location. The contact surface may by annular in plan view. The contact surface may be oval in plan view, for instance with straight sides or curved sides.

The second contact surface may extend around the entire perimeter of the receiving location. The second contact surface may be provided at the edge of the closure element, particularly on the lower surface thereof and/or may be provided at the edge of the receiving location and/or may be provided intermediate the edge of the closure element and edge of the receiving location. The second contact surface may be a planar surface. The second contact surface may be horizontal +/−10°. The second contact surface may be inclined, for instance with a part which is closer to the receiving location lower than a part which is further from the receiving location. The second contact surface may by annular in plan view. The second contact surface may be oval in plan view, for instance with straight sides or curved sides.

The contact surface and second contact surfaces may have complementary profiles. The contact surface and the second contact surface may have corresponding shapes and/or configurations and/or dimensions.

The contact surface and second contact surface may provide a restriction to the flow of gas from the environments of the apparatus into the receiving location. The contact surface and second contact surface may seal the receiving location against the flow of gas from the environments of the apparatus into the receiving location. The gas may be air. The gas may include oxygen.

The contact surface and second contact surface may directly abut one another. The contact surface and second contact surface may indirectly abut one another, for instance one or more components may be provided in the contact surface and/or the second contact surface and those may abut one another and/or the opposing contact surface. One or more agents may be provided between the contact surface and the second contact surface and/or in proximity thereto. The one or more agents may be metal from within the receiving location.

The inside of the container may be provided with one or more through apertures. The one or more through apertures may lead to a channel or chamber. The channel or chamber may be provided in the support structure and/or below the container.

In the first state, the receiving location may be exposed.

In the second state, the contact may provide a restriction to the flow of gas from the environments of the apparatus into the receiving location and/or may seal the receiving location against the flow of gas from the environments of the apparatus into the receiving location.

One or more parts of the closure element may provide one or more support locations. The one or more support locations may support a further apparatus, particularly a further support structure thereof, provided on top of the apparatus. One or more parts of the container, particularly the support structure, may provide one or more support locations. The one or more support locations may contact a further apparatus, particularly a closure element thereof, provided below the apparatus.

The fourth and/or fifth aspects of the invention may include any of the features, options or possibilities set out herein, including in the description and/or other aspects.

According to a sixth aspect, the invention provides a method of handling a molten metal processing by-product, the method including: providing a device comprising: an enclosure, the enclosure being provide with one or more air inlets and one or more air outlets, an air flow passing from a first feed location into the enclosure, out of the enclosure and to a first exit location; a compressing element, the compressing element being provided with one or more connections to a fluid flow supply; a fluid flow passing from a second feed location into the enclosure, into the compressing element, out of the compressing element and out of the enclosure to a second exit location; an actuator connected to the compressing element; the method including: providing metal and by-product to be separated in the container unit; providing the container unit in the enclosure; moving the compressing element to compress the by-product in the container unit; providing a fluid flow into the compressing element, the fluid flow providing cooling for the compressing element; providing an air flow from one or more air inlets to one or more air outlets; wherein the air flow between the first feed location and the first exit location is physically separate from the fluid flow between the second feed location and the second exit location.

According to a seventh aspect, the invention provides a device for handling a molten metal processing by-product, the device comprising: a metal from by-product separator including: an enclosure, the enclosure being provide with one or more air inlets and one or more air outlets, an air flow route passing from a feed location into the enclosure, out of the enclosure and to a second exit location; a compressing element, a compressing element, the compressing element being provided with one or more connections to a fluid flow supply; a fluid flow route passing from a second feed location into the enclosure, into the compressing element, out of the compressing element and out of the enclosure to a second exit location; an actuator connected to the compressing element; wherein the compressing element includes: wherein the air flow route between the first feed location and the first exit location is physically separate from the fluid flow route between the second feed location and the second exit location.

The one or more air inlets may be gaps or apertures in the enclosure. One or more air inlets may be provided in the upper quarter of the height of the enclosure. One or more air inlets may be provided in the lower quarter of the height of the enclosure. One or more air inlets may be provided above a door to the enclosure. One or more air inlets may be provided below a door to the enclosure.

The one or more air outlets may be provided on the opposing side of the enclosure to one or more of the air inlets.

The one or more inlets may be an entrance to a conduit, preferably a single conduit. One or more of the inlets may be provided in the upper quarter of the height of the enclosure, including in the roof of the enclosure.

The air flow may be generated by and/or increased by an air mover, such as a blower. The blower may be provided in the air flow route before and/or after the enclosure.

The first feed location may be a location outside of the enclosure. More preferably the first feed location is a location outside of the building in which the enclosure is provided. The first feed location may be outside of any building at all.

The enclosure may have at least one inlet at a first height and at least one inlet at a second lower height. The air flow through the inlets may mix within the enclosure. The air flow may pass around one or more structures within the enclosure, potentially including the compression element, a container unit, by-product, the walls of the enclosure, the actuator and one or more of the conduit(s) defining the fluid flow route The air flow may be preferentially provided to one or more areas within the enclosure. The proportion of the air flow entering the enclosure through one or more upper inlets may be higher than through one or more lower inlets. The ratio of the volume of air passing through the upper gap compared with the lower gap may be in excess of 1.5 to 1, preferably in excess of 1.75 to 1, more preferably in excess of 2.5 to 1 and ideally in excess of 3.5 to 1.

The velocity of the air flow may be preferentially higher for one or more areas within the enclosure. The velocity of the air flow may be higher in the upper part of the enclosure than in the lower part. The velocity of the air flow in one or more upper inlets may be at least 2 times that in one or more lower inlets, preferably at least 3 times, more preferably at least 4 times and ideally at least 5 times.

One or more conduits may be provided to defined the air flow route between the enclosure and the first exit location. A single conduit is preferred.

The air flow may collect dust and/or one or more further gases present in the enclosure and/or may convey dust and/or one or more further gases towards the first exit location. The dust and/or one or more further gases may be passed to a dust collection unit and/or air flow treatment unit and/or off-gas treatment unit. The dust collection unit and/or air flow treatment unit and/or off-gas treatment unit may be provided after the second exit location along the air flow path.

The first exit location may be a location outside of the enclosure. More preferably, the first exit location is a location outside of the building in which the enclosure is provided. The first exit location may be outside of any building at all.

The fluid flow may be a further air flow.

The compression element may be provided with one or more fluid inlets. One or more fluid inlets may be provided in the upper surface of the compression element. One or more fluid outlets may be provided in the upper surface of the compression element. The one or more inlets may be provided on the other side of the compression element from one or more of the fluid outlets.

The fluid flow may be generated by and/or increased by a fluid mover, such as a blower. The blower may be provided in the fluid flow route before and/or after the compression element.

The second feed location may be a location outside of the enclosure. More preferably the second feed location is a location outside of the building in which the enclosure is provided. The second feed location may be outside of any building at all.

The first and second feed locations may be the same or different. The first and second exit locations may be different or the same.

One or more conduits may be provided to defined the fluid flow route between the second feed location and the compression element and/or between the compression element and the second exit location. The connection to the compression element may be by one or more flexible conduits.

Preferably the fluid flow does not collect dust and/or one or more further gases present in the enclosure and/or does not convey dust and/or one or more further gases towards the second exit location.

Preferably the fluid flow is kept physically separate from any dust and/or further gases in the enclosure and/or the environments of the enclosure, between the second feed location and the second exit location.

The second exit location may be a location outside of the enclosure. More preferably, the second exit location is a location outside of the building in which the enclosure is provided. The second exit location may be outside of any building at all.

The air flow route and the fluid flow route may be physically separated by the wall(s) of the conduit carrying the fluid flow from the second feed location into the compression element and/or by the compression element and/or by the wall(s) of the conduit between the compression element and the second exit location.

The air flow route and the fluid flow route may be physically separated by the compression element and/or a conduit leading from the enclosure to the first exit location.

The sixth and/or seventh aspects of the invention may include any of the features, options or possibilities set out herein, including in the description and/or other aspects.

BRIEF DESCRIPTION OF THE SEVERAL VIEWS OF THE DRAWINGS

Various embodiments of the invention will now be described, by way of example only, and with reference to the accompanying drawings in which.

DETAILED DESCRIPTION OF THE INVENTION

During primary and secondary operations which involve the generation of molten aluminium in a furnace, a slag or dross forms on the surface of the molten metal. The dross contains various waste components arising from the processing of the feed material. As well as waste components, the dross also includes significant aluminium content. As a result, when the aluminium stream and dross stream are separated following handling in the furnace, the dross stream is often fed to a dross press.

The dross press provides a container unit for the dross and a press head which is forced into the dross. Such an arrangement is shown in GB2314090. The mechanical force applied to the dross forces the still molten aluminium from the dross and out of the container unit and hence recovers that aluminium as further aluminium stream.

Existing designs face issues with the limits on the rate at which they cool the dross. The rate of cooling is important in obtaining high dross processing throughputs and in maximising the amount of useful metal recovered. The existing designs also have limits on the effectiveness and versatility of their control systems.

Cooling

Figure 1:
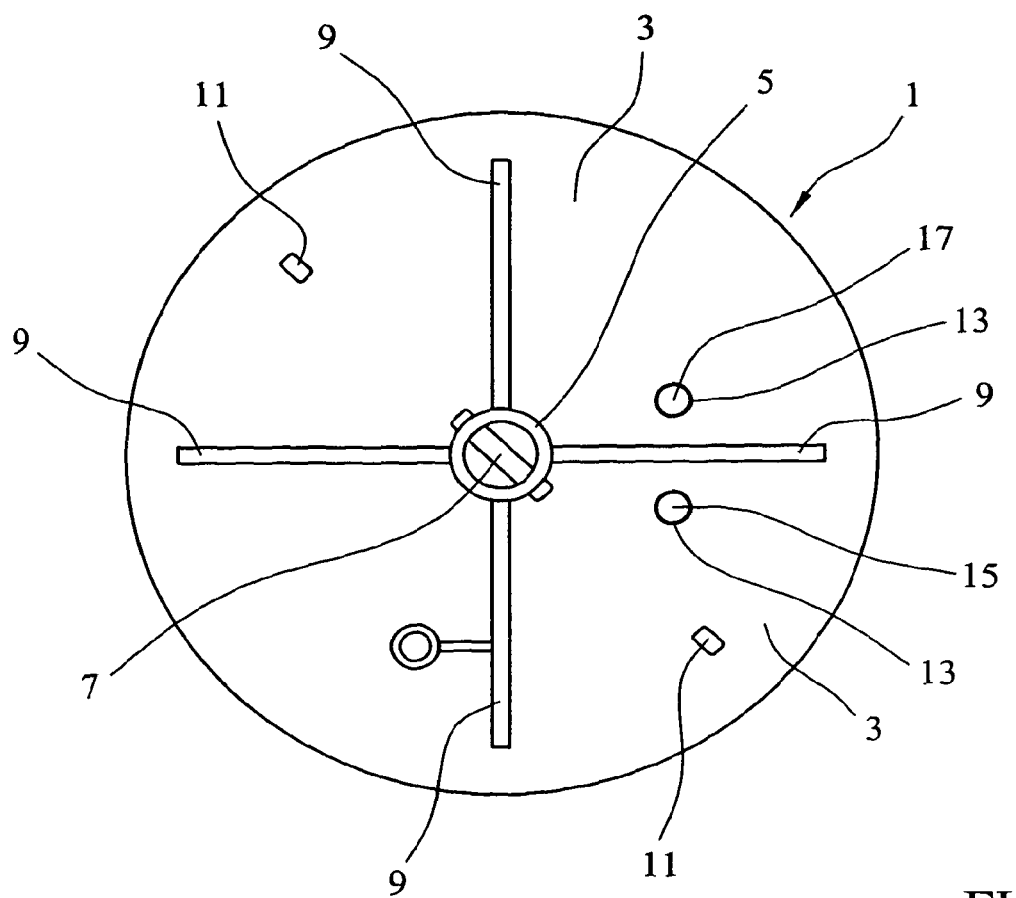
FIG. 1 illustrates a first embodiment of a dross pressing head according to the present invention in plan view.

In FIG. 1, a plan view from above of one embodiment of a press head 1 is provided. The press head 1 includes a substantially planar upper surface 3 and a central tube 5 at which location the actuator, not shown, for moving the press head up and down is provided. A pin 7 which passes through the tube 5 allows for the press head 1 is pivot relative to the actuator. Four braces 9 extend radially from the tube 5 to stiffen the press head 1. The press head 1 is provided with two loops 11 which can be used to lift the press head 1 during assembly, maintenance and the like.

Also provided on the upper surface 3 are mounts 13 for connection to air pipes, not shown. The air pipes are connected to the outside of the dross press. One of the mounts 13 provides an inlet 15 into the press head 1. The other mount 13 provides an outlet 17 from the press head 1. The inlet 15 and outlet 17 are used to flow cooling air through the inside of the press head 1.

Because the air is taken from the environments around the dross press, is fed through an air pipe to the press head 1, is fed out of the press head 1 along an air pipe and is returned to the environments of the dross press, that air does not come into contact with the air and dust inside the dross press. As a result, the risk of particulate material entering the press head 1 and interrupting flow with time is avoided. Additionally, the air leaving the press head 1 is not contaminated with dust and/or off gases from the dross press and so needs no or minimal treatment before it is return to the environments of the dross press. Any air flow from the environments into the dross press enclosure which comes into contact with such dust and off gases is handled separately through an outlet on the enclosure and appropriate dust and/or off gas treatment units.

Figure 2:
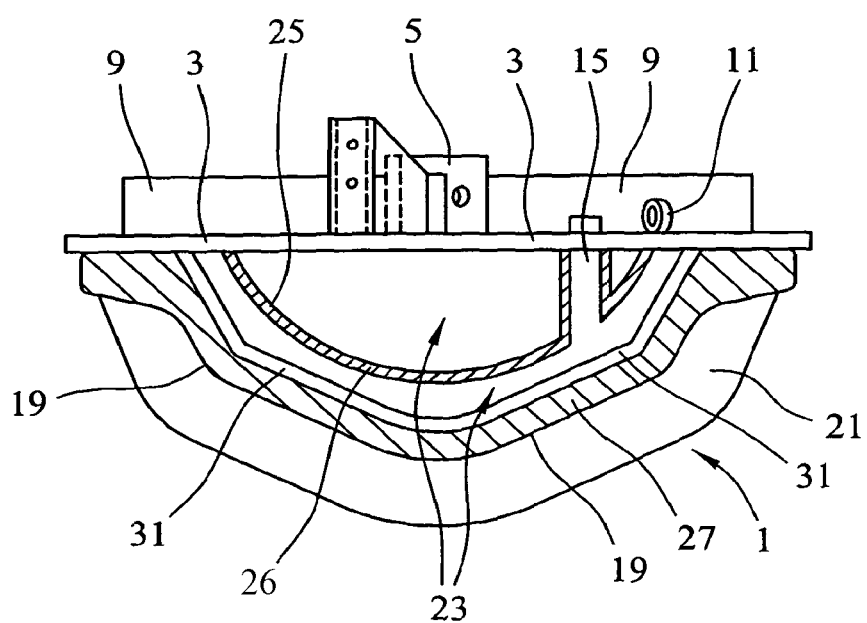
FIG. 2 illustrates the dross press head of FIG. 1 in a cross-sectional side view.
Figure 3:
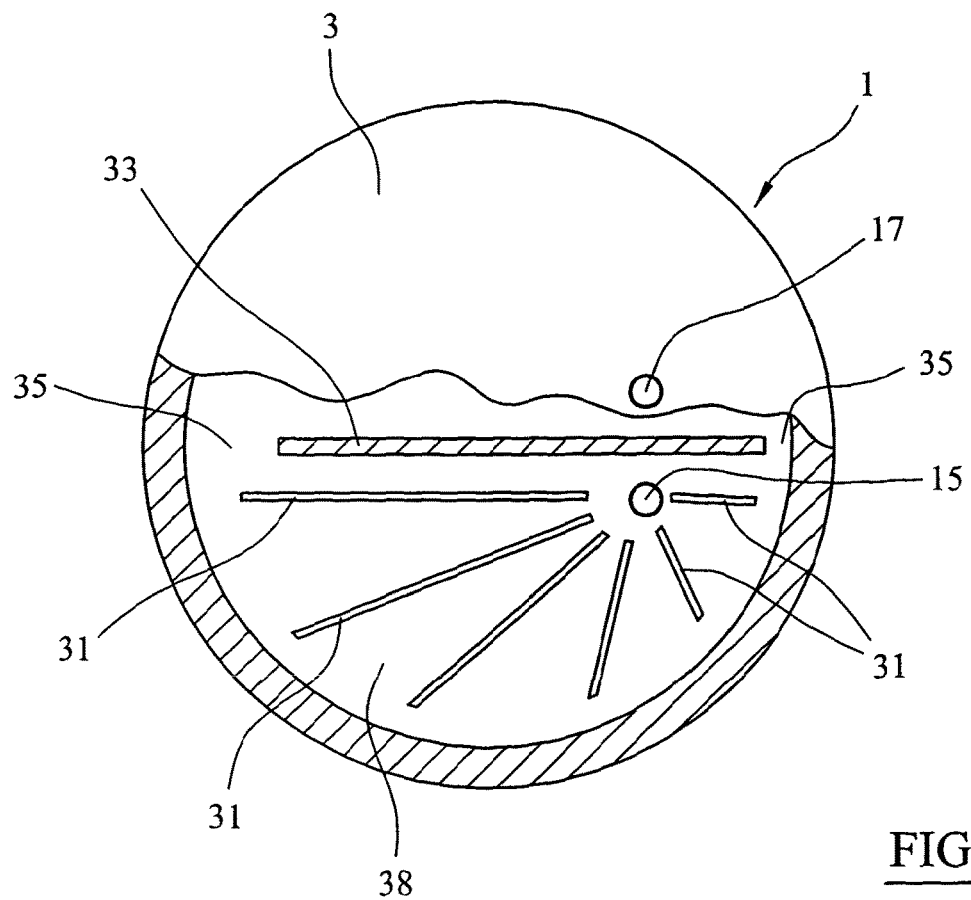
FIG. 3 illustrates the dross press head of FIG. 1 in cross-sectional plan view.

In the cross-sectional views of FIG. 2 and FIG. 3, the air flow within the press head 1 is illustrated.

The press head 1 has a lower surface 19 which is dome shaped. The lower surface 19 has protrusions 21 which extend therefrom. In this embodiment these form a X shaped pair of protrusions 21 in the press head 1. Other protrusion configurations are possible. The press head 1 has a hollow 23 inside. The hollow 23 includes an upper surface 25, exemplified by an upper baffle which causes the air entering through inlet 15 to flow downwards towards inside of the wall 27 of the lower surface 19. The upper baffle 25 is provided by a 3 mm thick plate, and includes an inner surface 26. The lower surface 19 is the part of the press head 1 which receives the most heat in use and so the cooling air is hence directed towards the hottest location so as to have maximum effect.

The wall 27 has a series of baffles in the form of ribs 31 provided on its inner surface 38. The ribs 31 cause the air to radiate outward from the inlet 15 and so reach all parts of the wall 27 in the half of the press head 1. The ribs are 25 mm high off the inner surface 38 and have a 25 mm gap between their top surface and the bottom of the upper baffle 25. A baffle 33 divides the inlet half from the outlet half, but has openings 35 at either end to allow air flow into the outlet half. Further baffles under the planar surface 3 are used to control the flow back to the outlet 17 and ensure that the air contacts all parts of the inner surface 38 in the outlet half too.

The overall effect of the baffle structure is to direct the air flow widely and to the hottest parts so as to give best cooling of the press head 1.

Figure 4:
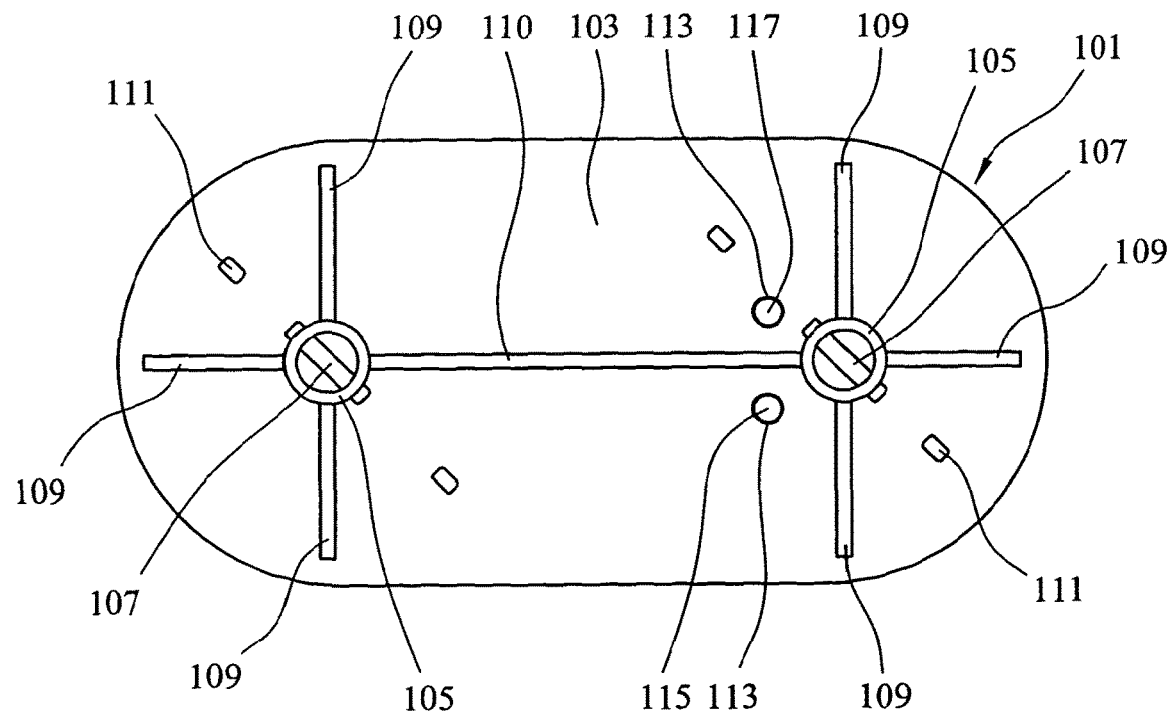
FIG. 4 illustrates a second embodiment of a dross pressing head according to the present invention in plan view.

In FIG. 4, a plan view from above of another embodiment of a press head 101 is provided. The press head 101 includes a substantially planar upper surface 103 and two tubes 105 at which locations the actuator, not shown, for moving the press head up and down are provided. A pin 107 which passes through the tube 105 is provided in each case to allow for the press head 101 is pivot relative to the actuator. Three braces 109 extend radially from each tube 105, together with a linking centre line rib 110 so as to stiffen the press head 101. The press head 101 is provided with two pairs of loops 111 which can be used to lift the press head 101 during assembly, maintenance and the like.

Also provided on the upper surface 103 are mounts 113 for connection to air pipes, not shown. The air pipes are connected to the outside of the dross press. One of the mounts 113 provides an inlet 115 into the press head 101. The other mount 113 provides an outlet 117 from the press head 101. The inlet 115 and outlet 117 are used to flow cooling air through the inside of the press head 101.

Figure 5:
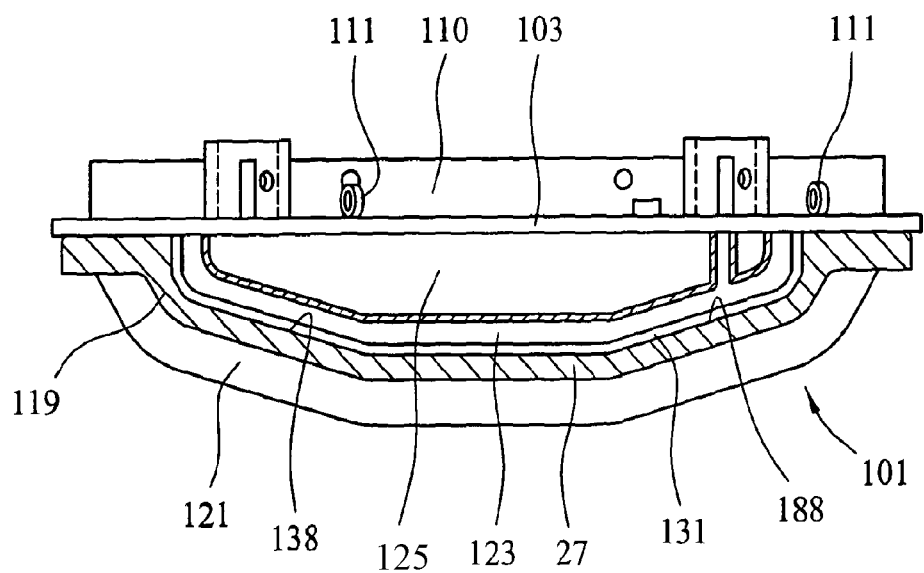
FIG. 5 illustrates the dross press head of FIG. 4 in a cross-sectioned side view.
Figure 6:
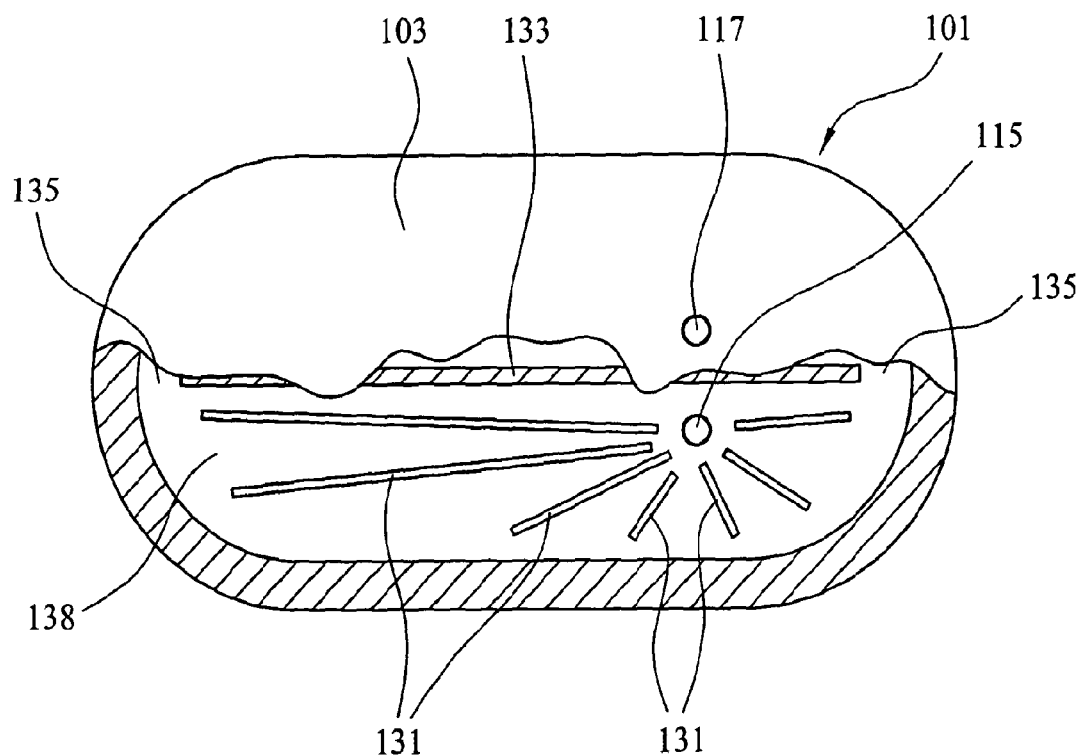
FIG. 6 illustrates the dross press head of FIG. 4 in cross-sectional side view.

In the cross-sectional views of FIG. 5 and FIG. 6, the air flow within the press head 1 is illustrated.

The press head 101 has a lower surface 119 which is dome shaped. The lower surface 119 has protrusions 121 which extend therefrom. In this embodiment the protrusions 121 are provide with one ending from end to end along the long axis of the press head 101, with two protrusions 121 at 90° thereto extending across the narrower width of the press head 101. Other protrusion configurations are possible.

The press head 101 has a hollow 123 inside. The hollow 123 includes an upper baffle 125 which causes the air entering through inlet 115 to flow downwards towards inside of the wall 127 of the lower surface 119. The lower surface 119 is the part of the press head 101 which receives the most heat in use and so the cooling air is hence directed towards the hottest location so as to have maximum effect.

The wall 127 has a series of baffles in the form of ribs 131 provided on its inner surface 138. The ribs 131 cause the air to radiate outward from the inlet 115 and so reach all parts of the wall 127 in the half of the press head 101. A baffle 133 divides the inlet half from the outlet half, but has openings 135 at either end to allow air flow into the outlet half. Further baffles under the planar surface 103 are used to control the flow back to the outlet 117 and ensure that the air contacts all parts of the inner surface 138 in the outlet half too.

The overall effect of the baffle structure is to direct the air flow widely and to the hottest parts so as to give best cooling of the press head 101.

Load, Process and Unload Control

Figure 7B:
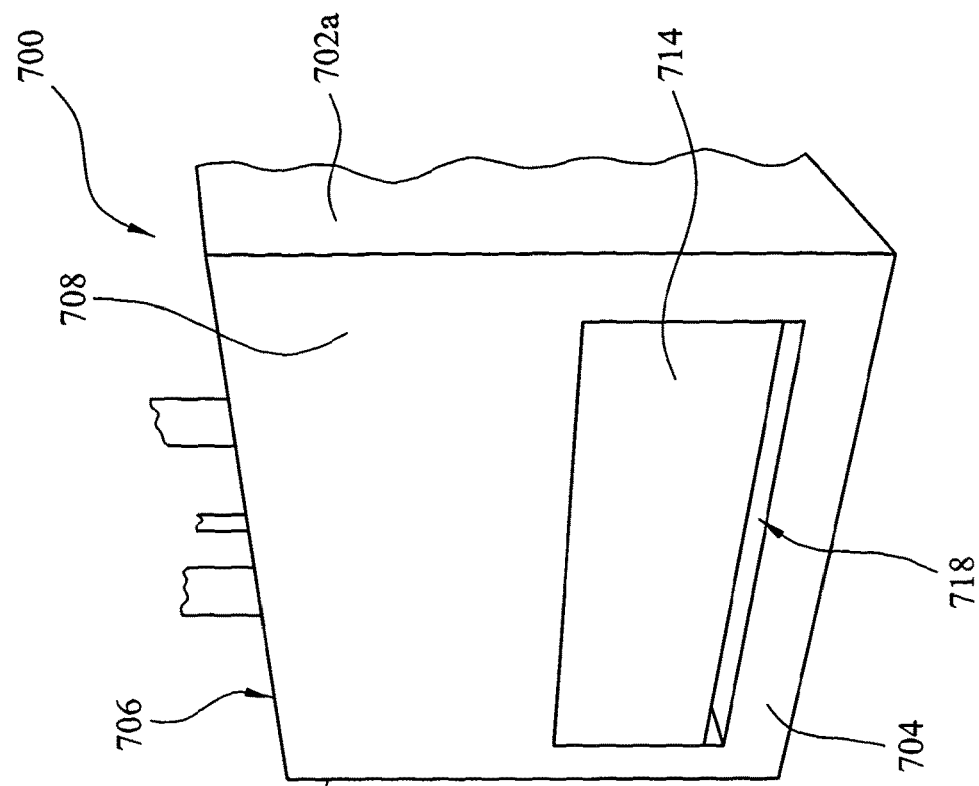
FIG. 7b illustrates the dross press of FIG. 7 with the door closed.
Figure 7A:
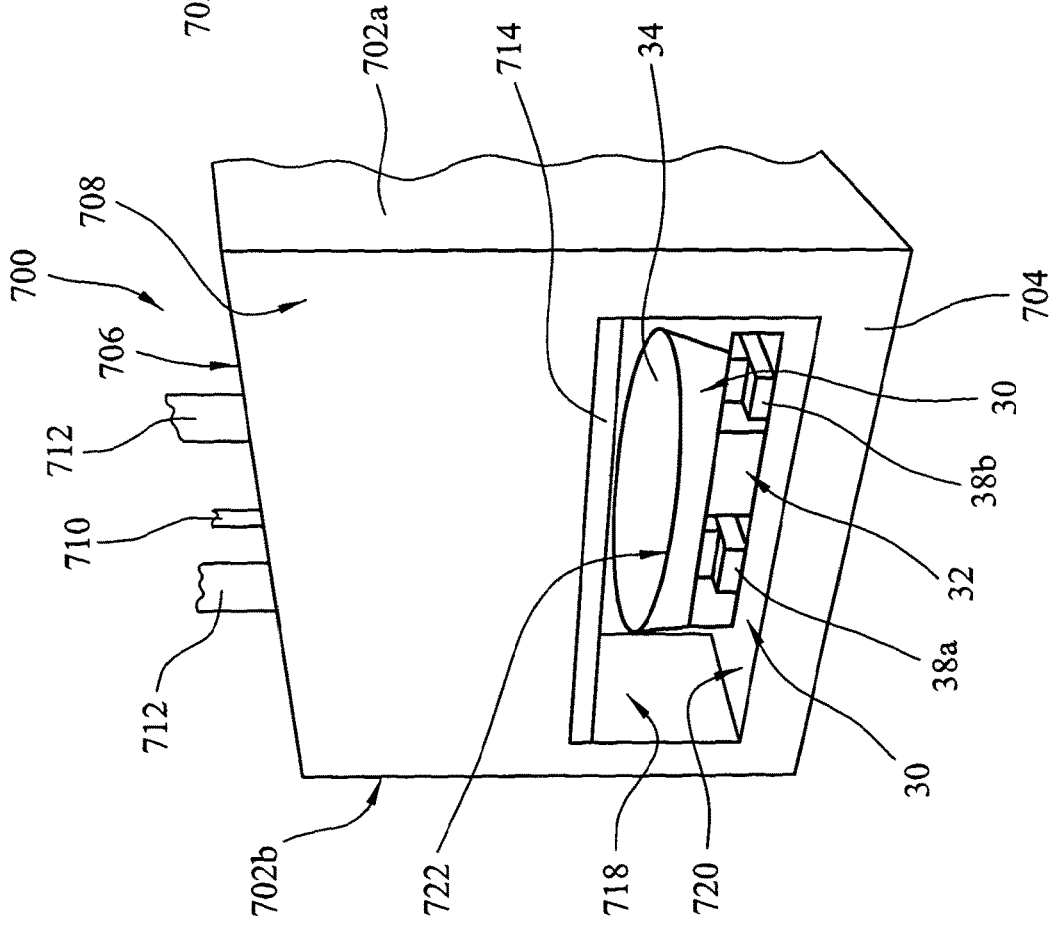
FIG. 7a illustrates a dross press according to an embodiment of the invention.

An example of a dross press 700 is shown in FIG. 7. It includes a side wall 702a, further side wall 702b, base 704 and roof 706. The rear wall and front wall 708 complete the structure.

In the roof 706 is an outlet 710 for air passing through the inside of the dross press 700. The outlet 710 leads to dust and/or off gas treatment units, not shown. Also in the roof are openings through which the actuators 712 can act upon the press head provided within the dross press 700.

The front wall 708 includes a door 714. This slides up and down within the front wall 708. As shown in FIG. 7, the door 714 is in the raised position.

The sequence of operations for the dross process 700 is as follows, according to this embodiment.

Firstly, a container unit 30 is provided. The container unit 30 provides a support structure 32 for a container 34. The container 34 is deepest in the middle and shallower at the periphery. The container 34 has an oval profile in plan, but other profiles can be used.

The support structure 32 includes a pair of recesses 38a, 38b which are configured to receive the lifting fork of a forklift truck, not shown. Other forms of lifting vehicle and/or apparatus could be used, such as cranes, but a forklift truck is most suited to the later operations.

The container unit 30 is brought to a loading location to receive the pile of dross. The dross may be loaded to the container 34 direct from a previous process, such as a furnace.

The container unit 30 is of metal, with steel alloy container 34. The materials can withstand temperatures in excess of 1600° C. The container 34 is constructed to encourage heat loss to the environment of the container unit 30.

Once loaded with dross, the container unit 30 is carried by the fork lift truck from the loading location to the dross press 700.

The door 714 on the dross press 700 is opened. The forklift truck advances the container unit 30 into the enclosure 718. As it does so, a part of the forklift and/or container unit 30 breaks a light beam across the mouth of the open door 714. This starts a sequence of events the controller for the dross press 700 expects.

The forklift truck is able to deposit the container unit 30 on a support surface 720.

The forklift truck can then be detached from the container unit 30 and all parts thereof exit the enclosure 718. As a result, the controller detects that the light beam across the mouth of the door is not longer being broken. This triggers the next step.

Until the light beam is restored, a safety interlock applies which prevents the door closing and/or the press head moving. The subsequent steps may progress automatically, subject to a correct situation being observed in each check.

In the next step, a further light beam is used to sense the level of the container unit 30, preferably in terms of the surface 722 around the top of the container 34. The level detected is interpreted by the controller and results in the identification of type of container unit 30 provided within the enclosure 718. For different types of container unit 30 and/or press head, the controller applies different forms and/or durations and/or sequences of subsequent steps. In particular, the level detected will be a factor in the extent of movement the actuators 712 go through to bring the press head towards the container unit 30.

Figure 8A:
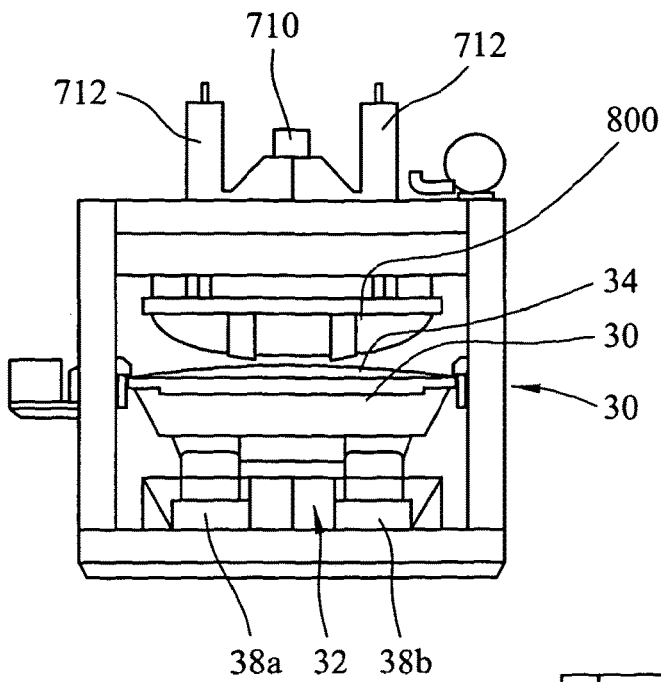
FIG. 8a illustrates the dross press of FIGS. 7a and b with a first container unit loaded therein.
Figure 8B:
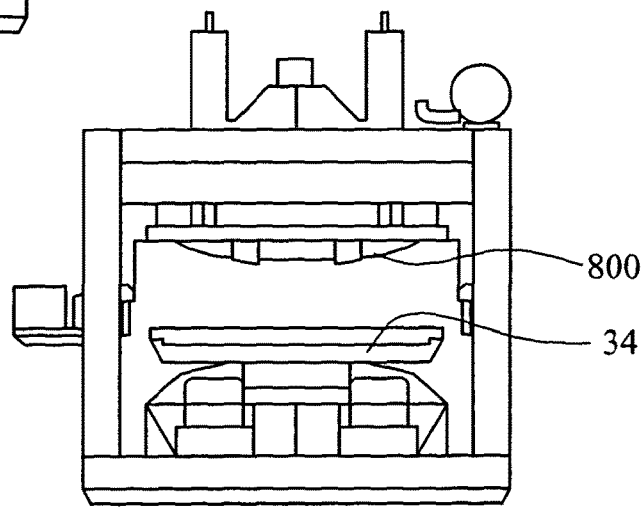
FIG. 8b illustrates the dross press of FIGS. 7a and b with a second different container unit loaded therein.

FIGS. 8a and 8b illustrate two situations where different levels apply. In the first case, a deeper container 34 is provided into which the press head 800 requires a first extent of insertion. In FIG. 8b, a shallower container 34 is provided and a consequentially smaller press head 800 is used. This requires a lower extent of insertion and hence the detection of the different levels is important.

The system also provides for a check that the container unit 30 and hence the container 34 are in the correct position on the support surface 720 and/or relative to the press head above.

As a first step in the dross pressing, the controller closest the door 714. The door 714 slides down until the closed position is reached. The closed position, shown in FIG. 8, still provides a 15 cm gap between the bottom edge of the door and the support surface 720. This allows a flow path for cooling air into the enclosure 718 and out via the outlet 710.

Sensors may be provided which confirm to the controller than the closed position for the door has been reached before other steps are permitted.

The controller then triggers movement of the actuators 712. These have a press head mounted on them, inside the enclosure 718. Further movement of the actuators 712 and press head downward cause the press head to push into the dross in the container 34. The dross is compressed as a result. The downward motion continues until the press head reaches the lowest position allowed by the controller. This may be a position and/or when the press head or a part thereof contacts the container unit 30 or a part thereof.

During the time in the container 34 molten metal is able to drain from the container 34 through one or more apertures provided in it. The molten metal collects in a sow mould beneath, in the support structure 32. The drainage of molten metal particularly occurs when the dross is compressed by the press head. The press head also provides for the cooling of the dross.

The controller applies the press head to the container 34 and contents for a desired time and at a desired load or load profile. The controller may provide for rotation and/or other motion being applied to the press head.

The controller then brings the actuators 712 and hence press head up out of the dross and out of the container 34. The door 714 is then opened on the command of the controller.

The forklift truck returns, engages with the container unit 30. Once again, the breaking of the light beam causes the controller to active the interlock preventing door 714 movement and/or movement of the press head. If the forklift truck withdraws without the container unit 30, the light beam configuration indicates that the container unit 30 has not been withdrawn and so the interlock remains. Only if the container unit 30 is withdrawn is the controller able to recognise another sequence of the method starting.

Figure 9:
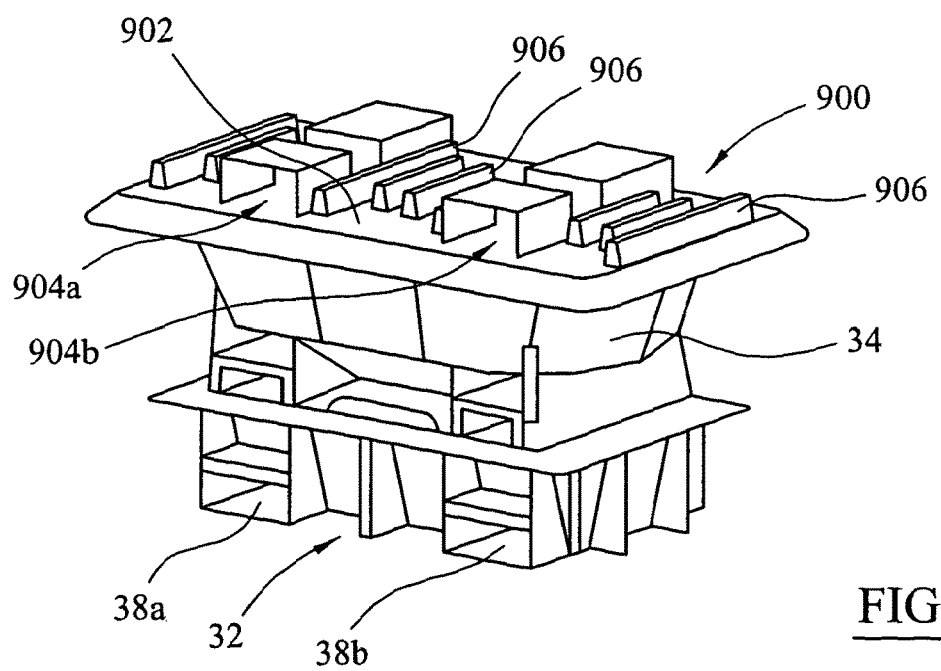
FIG. 9 illustrates the container unit with a closure element provided.

Once withdrawn from the enclosure 718, the container unit 30 is moved to a storage location to complete its cooling. At this stage, the forklift truck brings a closure element 900 and places it on the container unit 30. The closure element 900 can be seen in FIG. 9.

The closure unit 900 is in the form of a cover element 902 which is substantially planar in terms of its upper surface 904. The upper surface 904 has a pair of recesses 904a, 904b which are configured to receive the lifting fork of a forklift truck, not shown. The extent of the upper surface 904 is such as to cover the receiving location within the container 34. A contact surface on the underside of the closure element 900 abuts a contact surface on the upper of the container unit 30.

The upper surface 904 is provided with a series of protrusions 906 which increase the surface area of thereof and hence increase heat loss to the environments of the apparatus formed by the container unit 30 and closure element 900 combination.

The under surface of the closure element 900 is provided with a series of further protrusions which extend into contact with the dross. These serve to increase the area of the dross in contact with the closure element 900 and hence increase heat transfer to the closure element 900.

Once the dross has cooled to the required degree, the dross may be extracted and reprocessed. Each closure element 900 is provided with a pair of recesses 904a, 904b for this purpose to allow it to be lifted off the container unit 30 to allow emptying.

Air Flow Management

Figure 10:
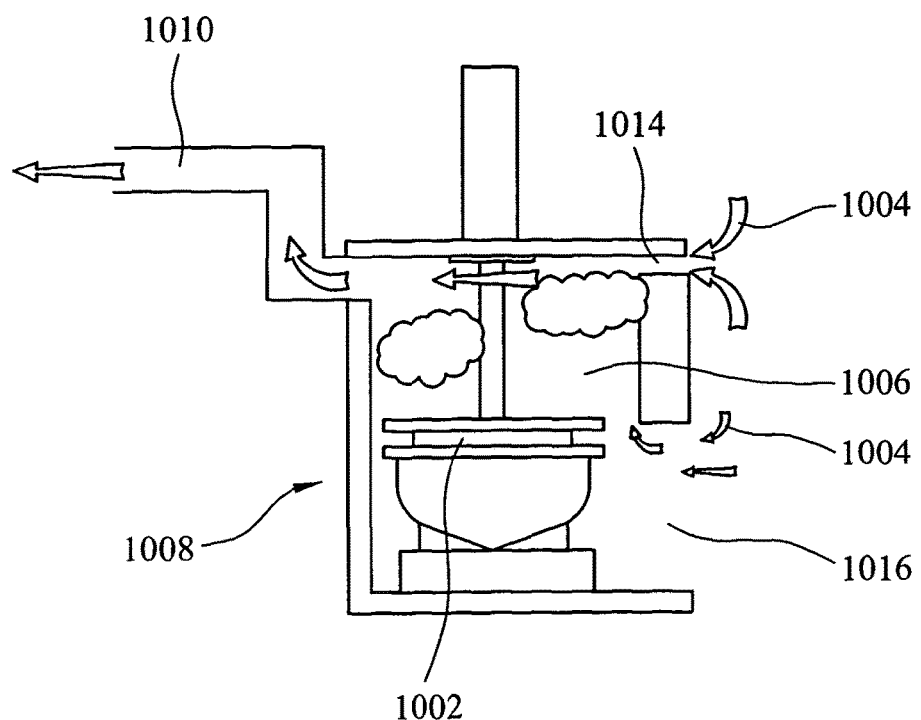
FIG. 10 is a sectional side view of the air flow through the enclosure in an embodiment of the invention.
Figure 11:
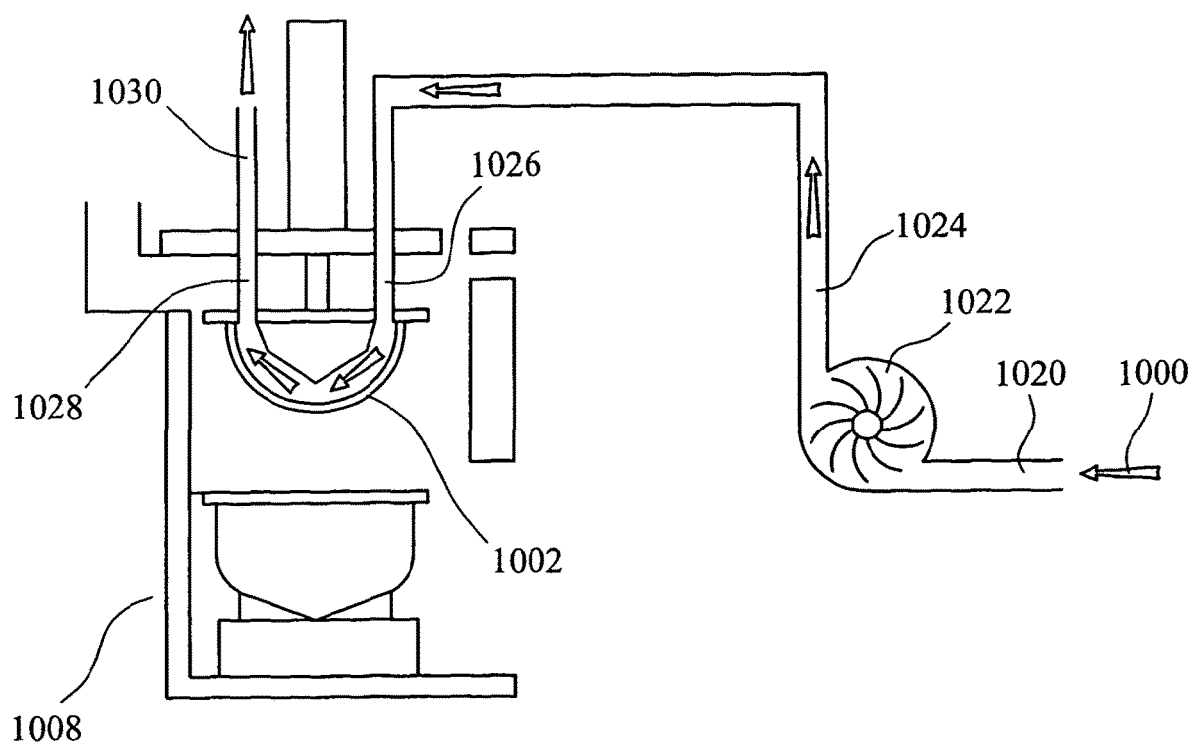
FIG. 11 is a sectional side view of the fluid flow through a compression element according to an embodiment of the invention.

As shown in FIG. 10 and FIG. 11, the cooling air 1000 for the press head 1002 is kept completely separate from the cooling air 1004 for the space 1006 within the enclosure 1008. The cooling air 1004 for the space 1006 also has a role in dust collection and control and in off gas collection and control.

In more detail, the cooling air 1004 for the space 1006 within the enclosure 1008 is drawn through the enclosure 1008 as a result of an air pump or blower, not shown, generating a pressure below atmospheric in conduit 1010. The conduit 1010 leads to an off-gas and dust treatment unit. The majority of the air flow into the enclosure 1008 from the environment 1012 in which the enclosure 1008 is positioned, is through the upper gap 1014. A lower proportion is drawn through lower gap 1016. As a consequence, the air velocity through the upper part of the enclosure 1008 is higher to ensure all off-gas and dust is effectively swept from the enclosure 1008.

The ratio of the volume of air passing through the upper gap compared with the lower gap may be in excess of 1.5 to 1, preferably in excess of 1.75 to 1, more preferably in excess of 2.5 to 1 and ideally in excess of 3.5 to 1.

The velocity of air in the upper gap may be at least 2 times that in the lower gap, preferably at least 3 times, more preferably at least 4 times and ideally at least 5 times. As shown in FIG. 11, the cooling air 1000 for the press head 1002 is drawn through feed conduit 1020 to a blower 1022 and then to flow conduit 1024. The air flow entering the conduit 1020 is preferably taken from outside of the plant or another dust free environment. The flow may be filtered to ensure it is dust free. The flow conduit 1024 enters the enclosure 1008 and through flexible connectors 1026 passes the cooling air 1000 into the top of the press head 1002. The cooling air 1000 is in contact with the inside surface of the domed press head surface which contacts the hot by-product. The cooling air 1000, now at a raised temperature, leaves the press head and passes through flexible connector 1028, then out of the enclosure 1008 and through exit conduit 1030. The exit conduit may feed the cooling air 1000 to a treatment unit, but generally this is not necessary as the cooling air 1000 is kept apart from the dust and off-gases all the time it is within the process plant.

The invention claimed is:

1. A dross compressing unit, the compressing unit having:
an upper surface provided with an inlet and an outlet;
a lower surface;
an interior which is at least a partially hollow interior provided between the upper surface and the lower surface, the at least partially hollow interior being connected to the inlet and the outlet;
the at least partially hollow interior being provided with:
one or more fluid flow constraining surfaces provided by one or more walls of the at least partially hollow interior; and
one or more fluid flow control members provided in the at least partially hollow interior, the one or more fluid flow control members being additional to the one or more fluid flow constraining surfaces provided by the one or more walls of the at least partially hollow interior;
wherein the one or more fluid flow control members are or include a dividing baffle which is provided between the inlet and the outlet, the dividing baffle extending from an inner surface of the lower surface to an inner surface of the upper surface, the dividing baffle being connected to the inner surface of the lower surface continuously along the length of the dividing baffle, the dividing baffle further being connected to the inner surface of the upper surface, the dividing baffle dividing the at least partially hollow interior into an inlet side of the at least partially hollow interior and an outlet side of the at least partially hollow interior, a gap at one or both ends of the dividing baffle to allow fluid flow for the inlet side of the at least partially hollow interior to the outlet side of the at least partially hollow interior.

2. The dross compressing unit of claim 1, wherein the one or more fluid flow control members include one or more upper baffles defining a surface in opposition to the inside surface of the lower surface of the compressing unit.

3. The dross compressing unit of claim 2, wherein the one or more upper baffles defining a surface in opposition to the inside surface include one or more upper baffles are provided at a constant separation from the inner surface of the lower surface of the compressing unit or are provided within a limited range of separation values from the inner surface of the lower surface of the compressing unit.

4. The dross compressing unit of claim 3, wherein the limited range of separation values is a minimum of 20 mm and is a maximum of 80 mm.

5. The dross compressing unit of claim 1, wherein a gap, between one side and the other side of the dividing baffle extending from the inner surface of the lower surface to the inner surface of the upper surface, is provided at one or more intermediate locations.

6. The dross compressing unit of claim 1, wherein the one or more flow control members also include one or more ribs or other projections, the one or more ribs or other projections extending in a radial direction relative to a junction of the inlet with the at least partially hollow interior and/or junction of the outlet with the at least partially hollow interior.

7. The dross compressing unit of claim 1, wherein the one or more ribs or other projections include ribs or other projections of one or more different lengths and/or widths and/or heights and/or profiles.

8. The dross compressing unit of claim 1, wherein the inlet is provided between a centre of the compressing unit and the periphery of the compressing unit, the inlet being provided between 40% and 60% of the way between a centre and periphery.

9. The dross compressing unit of claim 1, wherein the outlet is provided between a centre of the compressing unit and the periphery of the compressing unit, the outlet being provided between 40% and 60% of the way between a centre and periphery.

10. The dross compressing unit of claim 1, wherein the compressing unit is a press head for molten metal and/or molten metal processing by-products, the compressing unit including a lower surface and an upper surface, the lower surface having one or more downward extending protrusions or surfaces.

* * * * *